(12) United States Patent
Forgue et al.

(10) Patent No.: US 9,156,965 B2
(45) Date of Patent: Oct. 13, 2015

(54) ACCELERATOR COMPOSITION FOR ELASTOMERS

(75) Inventors: Jennifer A. Forgue, Danbury, CT (US);
Chris M. Nola, Franklin, TN (US);
Roger L. Burtraw, II, Elkhorn, WI (US)

(73) Assignee: VANDERBILT CHEMICALS, LLC, Norwalk, CT (US)

( * ) Notice: Subject to any disclaimer, the term of this patent is extended or adjusted under 35 U.S.C. 154(b) by 864 days.

(21) Appl. No.: 13/267,249

(22) Filed: Oct. 6, 2011

(65) Prior Publication Data

US 2012/0088887 A1 Apr. 12, 2012

Related U.S. Application Data

(60) Provisional application No. 61/390,363, filed on Oct. 6, 2010, provisional application No. 61/425,389, filed on Dec. 21, 2010.

(51) Int. Cl.
| | |
|---|---|
| *C08F 8/00* | (2006.01) |
| *C08L 59/00* | (2006.01) |
| *C08L 61/20* | (2006.01) |
| *C08K 5/3432* | (2006.01) |
| *C08L 71/03* | (2006.01) |

(52) U.S. Cl.
CPC .............. *C08K 5/3432* (2013.01); *C08L 71/03* (2013.01)

(58) Field of Classification Search
USPC .................... 525/330.3, 154, 157, 158, 328.2
See application file for complete search history.

(56) References Cited

U.S. PATENT DOCUMENTS

| | | | |
|---|---|---|---|
| 3,369,004 A | 2/1968 | Stanton et al. | |
| 2003/0144394 A1 | 7/2003 | Penot et al. | |
| 2004/0110905 A1 | 6/2004 | Kubota et al. | |
| 2009/0270549 A1 | 10/2009 | Horning | |
| 2010/0029857 A1 | 2/2010 | Soddemann et al. | |
| 2010/0179277 A1 | 7/2010 | Soddemann et al. | |
| 2010/0183875 A1 | 7/2010 | Mao et al. | |

FOREIGN PATENT DOCUMENTS

| | | |
|---|---|---|
| CN | 1834114 A | 9/2006 |
| JP | 2002-256121 A | 9/2002 |
| JP | 2010-090351 A | 4/2010 |
| WO | 2006/069191 A1 | 6/2006 |

OTHER PUBLICATIONS

International Preliminary Report on Patentability dated Nov. 9, 2013 enclosing Written Opinion of the International Searching Authority for PCT/US2011/055037 (PCT Counterpart of U.S. Appl. No. 13/267,249) dated Feb. 24, 2012.
International Search Report for PCT/US2011/055037 (PCT Counterpart of U.S. Appl. No. 13/267,249) dated Feb. 24, 2012.
TIPO Examination Report (with English translation) for TW Application No. 100136010 (TW Counterpart of U.S. Appl. No. 13/267,249) dated Mar. 5, 2015.
Office Action for Chinese Patent Application No. 201180047979.2 (CN Counterpart of U.S. Appl. No. 13/267,249) dated Feb. 25, 2014 (English translation unavailable).
Decision to Grant (with English translation) for Japanese Application No. 2013-531969 (JP Counterpart of U.S. Appl. No. 13/267,249) dated Dec. 15, 2014.
English translation of Notification of Reasons for Refusal for Japanese Application No. 2013-531969 (JP Counterpart of U.S. Appl. No. 13/267,249) dated Feb. 25, 2014.

*Primary Examiner* — Ling Choi
*Assistant Examiner* — Thuy-Ai Nguyen
(74) *Attorney, Agent, or Firm* — Norris McLauglin & Marcus P.A.

(57) ABSTRACT

The invention relates to an accelerator agent of a novel blend of aldehyde-amine condensation product and aliphatic amines for diaminic, metal oxide, sulfur, and triazine crosslinkable elastomers.

13 Claims, No Drawings

ACCELERATOR COMPOSITION FOR ELASTOMERS

BACKGROUND OF THE INVENTION

The invention relates to an accelerator agent comprising a novel blend of aldehyde-amine condensation product and aliphatic amines, for use with diaminic, metal oxide, sulfur, and triazine crosslinkable elastomers, in particular, ethylene acrylate elastomers (AEM) and polyacrylate elastomers (ACM), polyisoprene (IR), styrene butadiene (SBR), acrylonitrile butadiene (NBR), ethylene-propylene diene terpolymers (EPDM), isobutylene-co-isoprene (IIR), chlorinated isobutylene-co-isoprene (CIIR), and brominated isobutylene-co-isoprene (BIIR).

Diaminically crosslinkable ethylene acrylate elastomers (AEM) and polyacrylate elastomers (ACM) are relatively inexpensive elastomeric materials which are of interest in the area of seals, particularly those used in various elements of vehicle engines. AEM elastomers are available, for example, from DuPont under the trade name Vamac®, while ACM elastomers are available from Zeon Chemicals, for example, under the trade names Nipol® and HyTemp®.

Those AEM and ACM elastomers which are accessible to diaminic crosslinking comprise so-called cure site monomer units whose content in the elastomer is normally approximately 1 to approximately 5 phr. Conventionally, diaminically crosslinkable AEM and ACM elastomers are crosslinked with crosslinking agents such as, for example, hexamethylene diamine carbamate, N,N-dicinnamylide diamine carbamate, 4,4-diaminodicyclohexylmethane, m-xylene diamine, 4,4-diaminodiphenylmethane, 4,4-diaminodiphenyl ether and 2,2-bis[4-(4-amino-phenoxy)phenyl] propane, which can be used individually or in mixtures. Other suitable diamine crosslinking agents belong to the group of hexamethylene diamines.

US 2009/0270549 teaches a crosslinking agent for diaminically crosslinkable ethylene acrylate (AEM) and polyacrylate (ACM) elastomers, comprising a diamine crosslinker, an accelerator selected from 1,8-diazabicyclo-5,4,0-undec-7-ene (DBU), derivatives and salts thereof, and a moderator of the pyrrolidone type. The reference notes that while DBU, a tertiary amine, was a known accelerator, it was not possible to use with these AEM and ACM elastomers as it resulted in inferior compression set at elevated temperatures. The reference teaches that the problem is overcome by combining DBU with a moderator.

Polychloroprene (CR) and natural rubber (NR) elastomers are relatively inexpensive elastomeric materials which are used in many broad range rubber applications. CR elastomers are available, for example, from DuPont under the name Neoprene, while NR elastomers are widely available under many technical specified descriptions of natural rubber.

General purpose CR is used in molded and extruded goods, hoses, belts, wire and cables, heels and soles of shoes, coated fabrics, and gaskets. Most natural rubber is used in tires and automotive products. Other major applications of NR are industrial and engineering goods, footwear and adhesives.

CR and NR use differing crosslinking systems for their different polymeric chemical makeup. CR uses metal oxides as a curative while NR uses sulfur as its curative. Both crosslinking systems are used together with an accelerator, of which can be from a wide variety of chemical groups.

Polyepichlorohydrin is a triazine crosslinkable elastomer group, of which epichlorohydrin polymer (CO), copolymer of epichlorohydrin (ECO), and terpolymer of epichlorohydrin (GECO) are examples. Polyepichlorohydrin elastomers have a balance of properties that make it useful in automotive seals and hoses, and are available from Zeon Chemicals, for example, under the trade name Hydrin®.

Triazine crosslinking systems can be used with a variety of accelerators and retarders to make the cure systems widely adjustable.

These crosslinking systems are used together with an accelerator, which is preferably taken from substances of the guanidine group, to which, in particular, the accelerators OTBG, DOTG, DPG and/or biguanidine belong. However, due to possible toxicological problems, it is likely that these systems, particularly DOTG, will be phased out under regulatory requirements.

SUMMARY OF THE INVENTION

The present invention relates to an accelerator agent for crosslinkable elastomers. In particular, the invention relates to a novel blend of an aldehyde-amine condensation product and an aliphatic amine. The aldehyde-amine condensation products may be of the type represented, for example, by 3,5-diethyl-1,2-dihyrdro-1-phenyl-2-propylpyridine ("PDHP"), a condensation product of butyraldehyde and aniline ("B-A rxn"), and a condensation product of butryaldehyde and butylamine.

The aliphatic amine is a mixture of high molecular weight fatty amines derived from natural sources (dialkyl secondary amines), such as dicocoalklyamine ("DCAA"), bis(hydrogenated tallow alkyl)amine ("BHTAA") and 1-Octadecanamine, N-octadecyl-amine.

It has been surprisingly found that a blend of aldehyde-amine condensation product and aliphatic amine can successfully be substituted for DOTG as an accelerator in the manufacture of elastomeric compounds. This novel accelerator blend is able to achieve outstanding results in diaminically crosslinkable AEM and ACM without the need of a pyrrolidone moderator, and as a direct replacement in metal oxide, sulfur, and triazine crosslinkable elastomers.

The accelerator blend may be present in the elastomer composition at up to 1-10 phr, preferably 0.2-4 phr. The blend itself may consist of the aliphatic amine and aldehyde-amine condensation product in a ratio by weight of about 1:10 to 10:1, preferably from 2:1 to 6:1. The invention resides in both the accelerator blend per se, and an elastomer composition comprising the blend.

DETAILED DESCRIPTION OF THE INVENTION

Applicants studied the effectiveness of substitutions for DOTG in AEM, ACM, CR, NR and ECO elastomeric compounds. The purpose of this invention was to provide a replacement for DOTG in cure systems for elastomers which retains similar physical properties to the DOTG containing compound. This invention uses the blend of aliphatic amines and an aldehyde-amine condensation product to replace DOTG in elastomers. This combination gives similar physical properties (+/−20%) to DOTG while maintaining similar processing characteristics of the rubber compound and retained properties after heat aging.

The physical properties of importance are:
Compression Set
Aged Elongation
Aged Tensile Strength
To show accelerator effectiveness, the following rheology properties were monitored:
Cure State by Maximum Torque, MH
Cure time, t'90

In order to demonstrate the synergistic effect, we examined the use of each component separately and their resultant property trends. Testing was first done in AEM to develop an acceptable accelerator and then confirmed its performance in ACM, CR, NR, and ECO. This invention relates to the use of this novel accelerator blend in diaminic, metal oxide, sulfur, and triazine crosslinkable elastomers.

The master batch for the AEM elastomer is set forth in Table 1 below.

TABLE 1

Control AEM recipe with generic chemical and use descriptions, and control testing conditions:

| Ingredients | phr |
| --- | --- |
| AEM G (ethylene acrylic elastomer) | 100.0 |
| N774 Carbon Black (filler) | 65.0 |
| Stearic Acid (release agent) | 1.5 |
| Octadecylamine (release agent) | 0.5 |
| Dicumyl diphenylamine (antioxidant) | 2.0 |
| Polyoxyethylene octadecyl ether phosphate (release agent) | 1.0 |
| HDMC (crosslinking agent) | 1.5 |
| DOTG (accelerator) | 4.0 |

ASTM D5289 - Moving Die Rheometer @ 177° C., 0.5° Arc
Slabs Cured 10 min. @ 177° C. and Postcured 4 hrs. @ 175° C.
ASTM D412, Method A, Die D - Stress Strain Tests
ASTM D573 - Aging 168 hrs. @ 177° C.
ASTM D395, Method B, Plied Disks - Compression Set After 168 hrs. @ 177° C.

Applicants studied the effectiveness of substitutions for DOTG in AEM elastomers, particularly 3,5-diethyl-1,2-dihyrdro-1-phenyl-2-propylpyridine (PDHP), bis(hydrogenated tallow alkyl)amines (BHTAA), and finally blend of the two components. This invention uses the blend of aliphatic amines and an aldehyde-amine condensation product to replace DOTG.

Use of the BHTAA and PDHP alone is shown against the combination of the two components in Table 2. The superior results from the combination of the two products show the synergistic effect of the blend when compared to each of the product's physical property trends alone.

The optimal blend ratio of 6:1 BHTAA:PDHP was then tested to show the working ranges of this combination. The most preferred phr level is an equivalent usage to the DOTG at 4 phr. The summary data in Table 2 shows that up to a 10 phr level gives an effective working range of this combination. The preferred usage level is 0.2-4 phr, and 10 phr is the outer usage level.

The ratio of the blending was tested to show the working range of this combination. The summary data in Table 3 proves that even the far ranges of a blend at a 1:10 and a 10:1 ratio gives improved performance over the same usage level of the products alone, with the most preferred blend ratio being a 6:1 BHTAA:PDHP level.

TABLE 2

R-2022

| | DOTG (4 phr) | BHTAA (4 phr) | PDHP (4 phr) | BHTAA/PDHP 6:1 (4 phr) | BHTAA/PDHP 6:1 (10 phr) |
| --- | --- | --- | --- | --- | --- |
| CSet, % | 35.4 | 38.1 | 41.1 | 35.6 | 37.4 |
| Aged Elongation, % | 176 | 219 | 177 | 216 | 182 |
| Aged Tensile Strength, MPa | 12.29 | 13.60 | 13.67 | 14.55 | 12.49 |
| MH, dN-m | 14.88 | 12.39 | 12.70 | 13.56 | 12.29 |
| t'90, min. | 10.84 | 12.98 | 6.32 | 11.51 | 10.53 |

TABLE 3

R-2012

| | DOTG (4 phr) | BHTAA/PDHP 1:10 (4 phr) | BHTAA/PDHP 10:1 (4 phr) |
| --- | --- | --- | --- |
| CSet, % | 34.1 | 39.3 | 35.1 |
| Aged Elongation, % | 189 | 170 | 192 |
| Aged Tensile Strength, MPa | 13.39 | 12.06 | 13.13 |
| MH, dN-m | 13.60 | 11.74 | 12.18 |
| t'90, min. | 7.68 | 6.24 | 8.29 |

Finally, other types of starting materials were tested to show the novel blend of aldehyde-amine condensation product and aliphatic amines works in addition to the specific components studied.

The aliphatic amine dicocoalklyamine ("DCAA") was tested alone and in combination with PDHP to show the combination of these two also can replace DOTG (Table 4). The optimal blend ratio of 6:1 was tested at a high and low level range of 2 and 10 phr. The optimal phr level was tested with the far ratio range of 10:1 DCAA:PDHP.

TABLE 4

R-2024

| | DOTG (4 phr) | DCAA (4 phr) | DCAA/PDHP 6:1 (2 phr) | DCAA/PDHP 6:1 (10 phr) | DCAA/PDHP 10:1 (4 phr) |
| --- | --- | --- | --- | --- | --- |
| CSet, % | 35.6 | 35.4 | 34.9 | 38.8 | 33.8 |
| Aged Elongation, % | 190 | 254 | 243 | 191 | 228 |
| Aged Tensile Strength, MPa | 13.23 | 15.43 | 14.97 | 12.09 | 14.27 |
| MH, dN-m | 15.23 | 13.20 | 13.75 | 12.09 | 13.63 |
| t'90, min. | 8.69 | 12.57 | 11.96 | 11.11 | 11.66 |

Next, the aldehyde-amine condensation product butyraldehyde and aniline ("B-A rxn") was tested alone and in combination with BHTAA to show its combination can replace DOTG (Table 5). The optimal blend ratio of 6:1 was tested at a phr level range of 2 and 8 phr. The optimal phr level was tested at an additional ratio range of 3:1 BHTAA:B-A rxn.

TABLE 5

R-2038

| | DOTG (4 phr) | B-A rxn (4 phr) | BHTAA/B-A rxn 6:1 (2 phr) | BHTAA/B-A rxn 6:1 (8 phr) | BHTAA/B-A rxn 3:1 (4 phr) |
| --- | --- | --- | --- | --- | --- |
| CSet, % | 36.6 | 45.4 | 40.6 | 39.3 | 37.9 |
| Aged Elongation, % | 237 | 186 | 234 | 173 | 219 |
| Aged Tensile Strength, MPa | 17.79 | 15.02 | 17.03 | 13.72 | 16.63 |
| MH, dN-m | 14.54 | 13.17 | 12.38 | 11.86 | 12.70 |
| t'90, min. | 12.18 | 9.72 | 13.73 | 13.04 | 12.45 |

The various blend ratios and phr level uses confirm the working ranges of the aldehyde-amine condensation product and aliphatic amines combination while using other starting materials.

Additional testing was done in the ACM polyacrylate elastomer to show that these combinations also provide similar physical properties to DOTG in that acrylic elastomer.

The master batch for the ACM elastomer is set forth in Table 6 below.

TABLE 6

Control ACM recipe with generic chemical and use descriptions, and control testing conditions:

| Ingredients | phr |
|---|---|
| ACM 212HR (polyacrylate elastomer) | 100.0 |
| N550 Carbon Black (filler) | 60.0 |
| Stearic Acid (release agent) | 1.0 |
| Dicumyl diphenylamine (antioxidant) | 2.0 |
| Release package | 2.0 |
| HDMC (crosslinking agent) | 0.6 |
| DOTG (accelerator) | 2.0 |

ASTM D5289 - Moving Die Rheometer @ 190° C., 0.5° Arc
Slabs Cured 6 min. @ 190° C. and Postcured 4 hrs. @ 177° C.
ASTM D412, Method A, Die D - Stress Strain Tests
ASTM D573 - Aging 168 hrs. @ 190° C.
ASTM D395, Method B, Plied Disks - Compression Set After 24 hrs. @ 175° C.

The summary data in Table 7 proves that the far ranges of a blend at a 1:10 and a 10:1 ratio gives improved performance over the same usage level of the products alone, with the most preferred blend ratio being a 6:1 BHTAA:PDHP level. In this elastomer, 2 phr is the optimal use level and Table 7 also shows the preferred ratio blend also working at a higher level of 4 phr. This data proves the combination of aldehyde-amine condensation product and aliphatic amines can provide the physical results to replace DOTG in ACM as well as in AEM.

TABLE 7

R-2035

| | DOTG (2 phr) | BHTAA (2 phr) | PDHP (2 phr) | BHTAA/PDHP 10:1 (2 phr) | BHTAA/PDHP 1:10 (2 phr) | BHTAA/PDHP 6:1 (2 phr) | BHTAA/PDHP 6:1 (4 phr) |
|---|---|---|---|---|---|---|---|
| CSet, % | 16.2 | 21.1 | 21.8 | 18.3 | 20.4 | 17.5 | 17.2 |
| Aged Elongation, % | 192 | 197 | 137 | 173 | 129 | 193 | 155 |
| Aged Tensile Strength, MPa | 8.20 | 7.54 | 8.67 | 7.42 | 8.61 | 8.10 | 8.49 |
| MH, dN-m | 9.55 | 7.77 | 9.89 | 7.94 | 10.13 | 8.29 | 8.61 |
| t'90, min. | 7.55 | 10.30 | 5.11 | 10.38 | 5.47 | 10.31 | 9.70 |

This invention was next tested in other crosslinkable elastomers systems to show that an accelerator agent of a novel blend of aldehyde-amine condensation product and aliphatic amines also replaces DOTG for metal oxide, sulfur, and triazine crosslinkable elastomers.

The master batch for the CR, NR, ECO elastomers is set forth in Tables 8-10 respectively, below.

TABLE 8

Control CR recipe with generic chemical and use descriptions, and control testing conditions:

| Ingredients | phr |
|---|---|
| CR W (polychloroprene elastomer) | 100.0 |
| N774 Carbon Black (filler) | 60.0 |
| Stearic Acid (release agent) | 0.5 |
| Naphthenic oil (process oil) | 5.0 |
| Plasticizer | 5.0 |
| Octylated diphenylamines (antioxidant) | 2.0 |
| Magnesium oxide (curative) | 4.0 |
| Zinc Oxide (crosslinking agent) | 5.0 |
| Sulfur (cure modifier) | 1.0 |

TABLE 8-continued

Control CR recipe with generic chemical and use descriptions, and control testing conditions:

| Ingredients | phr |
|---|---|
| Tetramethyl thiuram monosulfide (accelerator) | 1.0 |
| DOTG (accelerator) | 1.0 |

ASTM D5289 - Moving Die Rheometer @ 160° C., 0.5° Arc
Slabs Cured t'90 + 2 min. @ 160° C., Buttons Cured t'90 + 12.5 min@ 160° C.
ASTM D412, Method A, Die D - Stress Strain Tests
ASTM D573 - Aging 336 hrs. @ 100° C.
ASTM D395, Method B - Compression Set After 70 hrs. @ 121° C.

TABLE 9

Control NR recipe with generic chemical and use descriptions, and control testing conditions:

| Ingredients | phr |
|---|---|
| NR L (natural rubber elastomer) | 100.0 |
| N990 Carbon Black (filler) | 35.0 |
| N330 Carbon Black (filler) | 30.0 |
| Stearic Acid (release agent) | 2.0 |
| Zinc Oxide (cure activator) | 5.0 |
| Plasticizer | 2.0 |
| Process Aid | 2.0 |
| Octylated diphenylamines (antioxidant) | 1.5 |

TABLE 9-continued

Control NR recipe with generic chemical and use descriptions, and control testing conditions:

| Ingredients | phr |
|---|---|
| Sulfur (crosslinking agent) | 2.5 |
| Benzothiazyl disulfide (accelerator) | 0.5 |
| DOTG (accelerator) | 0.5 |

ASTM D5289 - Moving Die Rheometer @ 160° C., 0.5° Arc
Slabs Cured t'90 + 2 min. @ 160° C., Buttons Cured t'90 + 12.5 min@ 160° C.
ASTM D412, Method A, Die D - Stress Strain Tests
ASTM D573 - Aging 168 hrs. @ 100° C.
ASTM D395, Method B - Compression Set After 22 hrs. @ 100° C.

TABLE 10

Control ECO recipe with generic chemical and use descriptions, and control testing conditions:

| Ingredients | phr |
|---|---|
| ECO C2000 (epichlorohydrin elastomer) | 100.0 |
| N330 Carbon Black (filler) | 50.0 |
| Stearic Acid (release agent) | 1.0 |

TABLE 10-continued

Control ECO recipe with generic chemical and use
descriptions, and control testing conditions:

| Ingredients | phr |
|---|---|
| Magnesium Oxide (cure activator) | 3.0 |
| Calcium Carbonate (filler) | 5.0 |
| Nickel dibutyldithiocarbamate (antioxidant) | 1.0 |
| 2,4,6 Trimercapto-s-triazine (crosslinking agent) | 1.0 |
| DOTG (accelerator) | 0.2 |

ASTM D5289 - Moving Die Rheometer @ 200° C., 0.5° Arc
Slabs Cured t'90 + 2 min. @ 200° C., Buttons Cured t'90 + 12.5 min@ 200° C.
ASTM D412, Method A, Die D - Stress Strain Tests
ASTM D573 - Aging 168 hrs. @ 125° C.
ASTM D395, Method B - Compression Set After 22 hrs. @ 125° C.

The summary data in Table 11 shows that the blend gives improved performance over the same usage level of the products alone in the metal oxide crosslinkable CR elastomer. The blend ratio was tested at a 1:1 and a 6:1 BHTAA:PDHP level and at a 1 phr and 2 phr usage level. This data proves the combination of aldehyde-amine condensation product and aliphatic amines can provide the physical results to replace DOTG in metal oxide crosslinkable elastomers.

TABLE 11

R-2039

| | DOTG (1 phr) | BHTAA (1 phr) | PDHP (1 phr) | BHTAA/PDHP 1:1 (1 phr) | BHTAA/PDHP 1:1 (2 phr) | BHTAA/PDHP 6:1 (1 phr) | BHTAA/PDHP 6:1 (2 phr) |
|---|---|---|---|---|---|---|---|
| CSet, % | 58.6 | 64.8 | 55.6 | 58.8 | 53.0 | 61.0 | 55.1 |
| Aged Elongation, % | 179 | 196 | 185 | 180 | 183 | 194 | 188 |
| Aged Tensile Strength, MPa | 18.74 | 18.43 | 18.92 | 19.39 | 19.10 | 18.78 | 18.15 |
| MH, dN-m | 19.70 | 18.19 | 21.08 | 19.50 | 20.02 | 18.99 | 19.66 |
| t'90, min. | 30.28 | 39.79 | 16.65 | 27.28 | 14.01 | 32.86 | 25.36 |

The summary data in Table 12 shows that the blend gives improved performance over the same usage level of the products alone in the sulfur crosslinkable NR elastomer. The blend ratio was tested at a 1:1 and a 6:1 BHTAA:PDHP level and at a 1 phr and 2 phr usage level. This data proves the combination of aldehyde-amine condensation product and aliphatic amines can provide the physical results to replace DOTG in sulfur crosslinkable elastomers.

TABLE 12

R-2040

| | DOTG (1 phr) | BHTAA (1 phr) | PDHP (1 phr) | BHTAA/PDHP 1:1 (1 phr) | BHTAA/PDHP 1:1 (2 phr) | BHTAA/PDHP 6:1 (1 phr) | BHTAA/PDHP 6:1 (2 phr) |
|---|---|---|---|---|---|---|---|
| CSet, % | 58.4 | 54.5 | 63.5 | 58.5 | 62.8 | 54.7 | 60.2 |
| Aged Elongation, % | 114 | 136 | 132 | 124 | 132 | 120 | 118 |
| Aged Tensile Strength, MPa | 6.45 | 7.03 | 7.60 | 7.37 | 6.94 | 7.09 | 7.18 |
| MH, dN-m | 19.23 | 14.42 | 22.78 | 20.57 | 21.82 | 15.91 | 18.15 |
| t'90, min. | 3.92 | 5.47 | 2.59 | 3.17 | 2.45 | 4.52 | 3.54 |

The summary data in Table 13 shows that the blend gives improved performance over the same usage level of the products alone in the triazine crosslinkable ECO elastomer. The optimal blend ratio of 6:1 BHTAA:PDHP level was tested against both DOTG and DPG guanidines. This data proves the combination of aldehyde-amine condensation product and aliphatic amines can provide the physical results to replace guanidines in triazine crosslinkable elastomers.

TABLE 13

R-2049

| | DOTG (0.2 phr) | DPG (0.2 phr) | BHTAA/PDHP 6:1 (0.2 phr) |
|---|---|---|---|
| CSet, % | 21.8 | 21.1 | 20.5 |
| Aged Elongation, % | 267 | 261 | 286 |
| Aged Tensile Strength, MPa | 17.51 | 17.57 | 17.55 |
| MH, dN-m | 25.77 | 26.37 | 24.38 |
| t'90, min. | 3.69 | 3.50 | 4.90 |

This invention of blend of aldehyde-amine condensation product and aliphatic amines can successfully be substituted for DOTG as an accelerator in the manufacture of diaminic, metal oxide, sulfur, and triazine crosslinkable elastomeric compounds

What is claimed is:

1. A crosslinking accelerating agent for crosslinkable elastomers, the agent comprising: (a) a mixture of high molecular weight fatty amines, and (b) an aldehyde-amine condensation product, at a weight ratio (a):(b) of about 1:10 to about 10:1, wherein the mixture of high molecular weight fatty amines is selected from the group consisting of bis (hydrogenated tallow alkyl) amine, dicocoalklyamine, 1-octadecanamine, and N-octadecylamine.

2. The agent of claim 1, wherein the weight ratio of the mixture of high molecular weight fatty amines to the aldehyde-amine condensation product is about 6:1.

3. The agent of claim 1, wherein the a mixture of high molecular weight fatty amines is bis(hydrogenated tallow alkyl) amine.

4. The agent of claim 1, wherein the aldehyde-amine condensation product is chosen from the group consisting of 3,5-diethyl-1,2-dihyrdro-1-phenyl-2-propylpyridine ("PDHP"), a condensation product of butyraldehyde and aniline, and a condensation product of butyraldehyde and butylamine.

5. The agent of claim 4, wherein the aldehyde-amine condensation product is PDHP.

6. The agent of claim 1, wherein the a mixture of high molecular weight fatty amines is bis(hydrogenated tallow alkyl) amine and the aldehyde-amine condensation product is PDHP.

7. The agent of claim 6, wherein the weight ratio the mixture of high molecular weight fatty amines to aldehyde-amine condensation product is about 6:1.

8. A method of making an elastomer product, comprising the steps of reacting: A crosslinkable elastomer and a crosslinking agent present at 1-10 phr, the crosslinking agent comprising (a) a mixture of high molecular weight fatty amines and (b) an aldehyde-amine condensation product at a weight ratio of 1:10 to 10:1, wherein the mixture of high molecular weight fatty amines is selected from the group consisting of bis(hydrogenated tallow alkyl) amine, dicocoalklyamine, 1-octadecanamine, and N-octadecylamine.

9. The method of claim 6, wherein the mixture of high molecular weight fatty amines is bis(hydrogenated tallow alkyl) amine.

10. The method of claim 8, wherein the aldehyde-amine condensation product is chosen from the group consisting of 3,5-diethyl-1,2-dihyrdro-1-phenyl-2-propylpyridine ("PDHP"), a condensation product of butyraldehyde and aniline, and a condensation product of butyraldehyde and butylamine.

11. The method of claim 10, wherein the aldehyde-amine condensation product is PDHP.

12. The method of claim 8, wherein the mixture of high molecular weight fatty amines is bis(hydrogenated tallow alkyl) amine and the aldehyde-amine condensation product is PDHP.

13. The method of claim 12, wherein the weight ratio of the mixture of high molecular weight fatty amines to aldehyde-amine condensation product is about 6:1.

* * * * *